(12) United States Patent
Koreis

(10) Patent No.: US 9,579,850 B2
(45) Date of Patent: Feb. 28, 2017

(54) THREE DIMENSIONAL PRINTING OF PARTS

(71) Applicant: The Boeing Company, Chicago, IL (US)

(72) Inventor: Rocke Robert Koreis, Seattle, WA (US)

(73) Assignee: THE BOEING COMPANY, Chicago, IL (US)

( * ) Notice: Subject to any disclaimer, the term of this patent is extended or adjusted under 35 U.S.C. 154(b) by 423 days.

(21) Appl. No.: 14/019,129

(22) Filed: Sep. 5, 2013

(65) Prior Publication Data

US 2015/0064299 A1    Mar. 5, 2015

(51) Int. Cl.
| | |
|---|---|
| G06Q 10/00 | (2012.01) |
| G06F 19/00 | (2011.01) |
| G09G 5/00 | (2006.01) |
| G06K 15/00 | (2006.01) |
| B29C 67/00 | (2006.01) |
| G06Q 30/06 | (2012.01) |
| G06Q 50/04 | (2012.01) |

(52) U.S. Cl.
CPC ..... *B29C 67/0088* (2013.01); *G06Q 30/0603* (2013.01); *G06Q 50/04* (2013.01); *Y02P 90/30* (2015.11)

(58) Field of Classification Search
USPC .......................................................... 705/28
See application file for complete search history.

(56) References Cited

U.S. PATENT DOCUMENTS 5,600,574 A * 2/1997 Reitan ................ H04N 1/00002
                                                       702/185
5,617,236 A * 4/1997 Wang .................... G06F 13/385
                                                       375/214
(Continued)

FOREIGN PATENT DOCUMENTS

GB    WO 2012146943 A2 *    11/2012    ......... B29C 67/0059
GB    WO 2012146943 A3 *    1/2013     ......... B29C 67/0059
(Continued)

OTHER PUBLICATIONS

Alliance Aerospace Engineering, LLC. Low Cost Reverse Engineering Process: Experts in Using Today's State-of-the Art Tools. Press Release. Alliance Aerospace Engineering, Jul. 29, 2012. Web. Aug. 2, 2016.*

(Continued)

*Primary Examiner* — Ashford S Hayles
(74) *Attorney, Agent, or Firm* — Yee & Associates, P.C.

(57) ABSTRACT

A method and apparatus is presented. The apparatus comprises a parts library, a database, and a parts management system. The parts library is configured to store a plurality of part definition files. The database is configured to store entries identifying a printing of parts using the plurality of part definition files. The parts management system is configured to receive a request for a part definition file in the parts library, identify the part definition file in the plurality of part definition files in the parts library, receive an indication of a printing of a part using the part definition file, and store an entry identifying the printing of the part using the part definition file in the database.

17 Claims, 10 Drawing Sheets

(56) References Cited

U.S. PATENT DOCUMENTS

| | | | | |
|---|---|---|---|---|
| 6,550,052 B1* | 4/2003 | Joyce | G06F 8/20 | 700/113 |
| 8,412,588 B1* | 4/2013 | Bodell | G06Q 10/06 | 700/119 |
| 8,452,983 B2* | 5/2013 | Lin | G06F 21/10 | 713/189 |
| 9,092,776 B2* | 7/2015 | Dessert | G06Q 20/40 | |
| 2004/0034554 A1* | 2/2004 | Shirley | G06Q 10/06 | 705/7.13 |
| 2008/0111816 A1* | 5/2008 | Abraham | G06Q 30/06 | 345/420 |
| 2009/0303507 A1* | 12/2009 | Abeloe | B29C 67/0088 | 358/1.9 |
| 2010/0031351 A1* | 2/2010 | Jung | G06F 21/10 | 726/21 |
| 2010/0314794 A1* | 12/2010 | Dietrich | B29C 33/3842 | 264/219 |
| 2011/0087350 A1* | 4/2011 | Fogel | G06F 17/50 | 700/98 |
| 2012/0092724 A1* | 4/2012 | Pettis | B29C 67/0088 | 358/1.15 |
| 2012/0281013 A1* | 11/2012 | Mahdavi | G06F 17/50 | 345/619 |
| 2012/0310576 A1* | 12/2012 | Rose | G01N 29/4436 | 702/83 |
| 2013/0015596 A1* | 1/2013 | Mozeika | B25J 9/0084 | 264/40.1 |
| 2013/0184845 A1* | 7/2013 | Hales | G05B 19/41865 | 700/97 |
| 2013/0235412 A1* | 9/2013 | Baldwin | G06F 3/1238 | 358/1.14 |
| 2013/0297062 A1* | 11/2013 | Lacaze | B29C 67/0051 | 700/119 |
| 2014/0156053 A1* | 6/2014 | Mahdavi | B29C 67/0059 | 700/119 |
| 2014/0157579 A1* | 6/2014 | Chhabra | G06F 17/00 | 29/592 |
| 2014/0214684 A1* | 7/2014 | Pell | G06Q 30/02 | 705/57 |
| 2015/0005919 A1* | 1/2015 | McGatha | B29C 67/0088 | 700/119 |
| 2015/0052025 A1* | 2/2015 | Apsley | G06Q 30/0635 | 705/26.81 |
| 2015/0120806 A1* | 4/2015 | Lippincott | H04L 67/10 | 709/203 |

FOREIGN PATENT DOCUMENTS

| | | | | |
|---|---|---|---|---|
| WO | WO 2010061235 A1 * | 6/2010 | | B29D 24/005 |
| WO | WO2013036942 A1 | 3/2012 | | |

OTHER PUBLICATIONS

United States. Department of Transportation. Federal Aviation Administration. Parts Manufacturer Approval Procedure. By Dave W. Hempe. Washington, DC: FAA, 2008. Print.*

Extended European Search Report, dated Jan. 21, 2015, regarding Application No. EP14183413.5, 7 pages.

European Patent Office Communication, dated Sep. 8, 2016, regarding Application No. 14183413.5, 5 pages.

Canadian Intellectual Property Office Examination Search Report, dated Oct. 11, 2016, regarding Application No. 2,857,679, 4 pages.

* cited by examiner

| Transaction # | Client # | Printer # | Part # | Part Definition File Location | Print Time |
|---|---|---|---|---|---|
| 1437 | 8381 | 1 | B378 | Authorization System | 7/7/2013 09:38:04 |
| 1436 | 4447 | 1 | A129 | Three Dimensional Printing System | 7/9/2013 12:27:01 |
| 1435 | 5326 | 2 | C249 | Authorization System | 7/9/2013 15:01:45 |
| 1434 | 5326 | 2 | C249 | Authorization System | 7/9/2013 15:50:00 |
| 1433 | 5326 | 2 | C249 | Authorization System | 7/9/2013 16:43:32 |
| 1432 | 8381 | 1 | B331 | Authorization System | 7/10/2013 08:16:15 |
| 1431 | 8381 | 2 | B185 | Three Dimensional Printing System | 7/12/2013 13:29:00 |

FIG. 3

THREE DIMENSIONAL PRINTING OF PARTS

BACKGROUND INFORMATION

1. Field

The present disclosure relates generally to the manufacture of parts. More particularly, the present disclosure relates to the three dimensional printing of parts. Yet more particularly, the present disclosure relates to a method and apparatus for authorizing the three dimensional printing of parts.

2. Background

Modern aircraft contain a plurality of different parts. Aircraft manufacturers have each part design certified under airworthiness standards and other requirements of the Federal Aviation Administration (FAA). A certification for a part is specific to that part's specifications such as dimensions, shape, and material specifications.

During the lifetime of an aircraft, parts may be replaced. In order to meet demand for replacement parts, aircraft manufacturers may keep an inventory of parts on hand. A client may request parts from the aircraft manufacturer when a replacement part is desired. However, receiving requested parts from the aircraft manufacturer may take an undesirable amount of time for a client. Some clients may keep an inventory of parts on hand to avoid waiting an undesirable amount of time. However, storing an inventory of extra parts either at an aircraft manufacturer or at a client may use an undesirable amount of resources.

Three dimensional printing is a process of making a solid object of virtually any shape from a part definition file. Three dimensional printing is an additive process where successive layers of material are laid down. Three dimensional printing may be performed with a variety of different materials such as polymers, plasters, metals, and metal alloys. Three dimensional printing may allow on-demand manufacture of desired parts.

Therefore, it would be desirable to have a method and apparatus that take into account at least some of the issues discussed above, as well as other possible issues.

SUMMARY

In an illustrative embodiment, an apparatus is provided. The apparatus comprises a parts library, a database, and a parts management system. The parts library is configured to store a plurality of part definition files. The database is configured to store entries identifying a printing of parts using the plurality of part definition files. The parts management system is configured to receive a request for a part definition file in the parts library, identify the part definition file in the plurality of part definition files in the parts library, receive an indication of a printing of a part using the part definition file, and store an entry identifying the printing of the part using the part definition file in the database.

In another illustrative embodiment, a method is provided. The method comprises receiving a request for a part definition file in a parts library; identifying the part definition file in a plurality of part definition files in the parts library; receiving an indication of a printing of a part using the part definition file; and storing an entry identifying the printing of the part using the part definition file in a database.

In yet another illustrative embodiment, a system is presented. The system comprises a parts library, a database, a parts management system, and a three dimensional printing system. The parts library is configured to store a plurality of part definition files. The database is configured to store entries identifying a printing of parts using the plurality of part definition files. The parts management system is configured to receive a request for a part definition file in the parts library from the three dimensional printing system. The three dimensional printing system is configured to print parts using the plurality of part definition files.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIG. 3 is an illustration of a database in accordance with an illustrative embodiment;

DETAILED DESCRIPTION

The different illustrative embodiments recognize and take into account a number of different considerations. For example, the illustrative embodiments recognize and take into account that clients may prefer to three dimensionally print parts when desired rather than hold parts in inventory. Accordingly, the different illustrative embodiments recognize and take into account that a client three dimensionally printing parts may reduce the cost of storing parts. Further, the different illustrative embodiments recognize and take into account that a client three dimensionally printing parts may reduce the time to receive the parts.

The different illustrative embodiments recognize and take into account that an aircraft manufacturer may wish to limit access to intellectual property such as part definition files. Further, the different illustrative embodiments recognize and take into account that an aircraft manufacturer may desire payment upon each three dimensional printing of a part. Yet further, the different illustrative embodiments recognize and take into account that an aircraft manufacturer may wish to verify information from a three dimensional printing system so that printed parts meet certification requirements.

Figure 1:
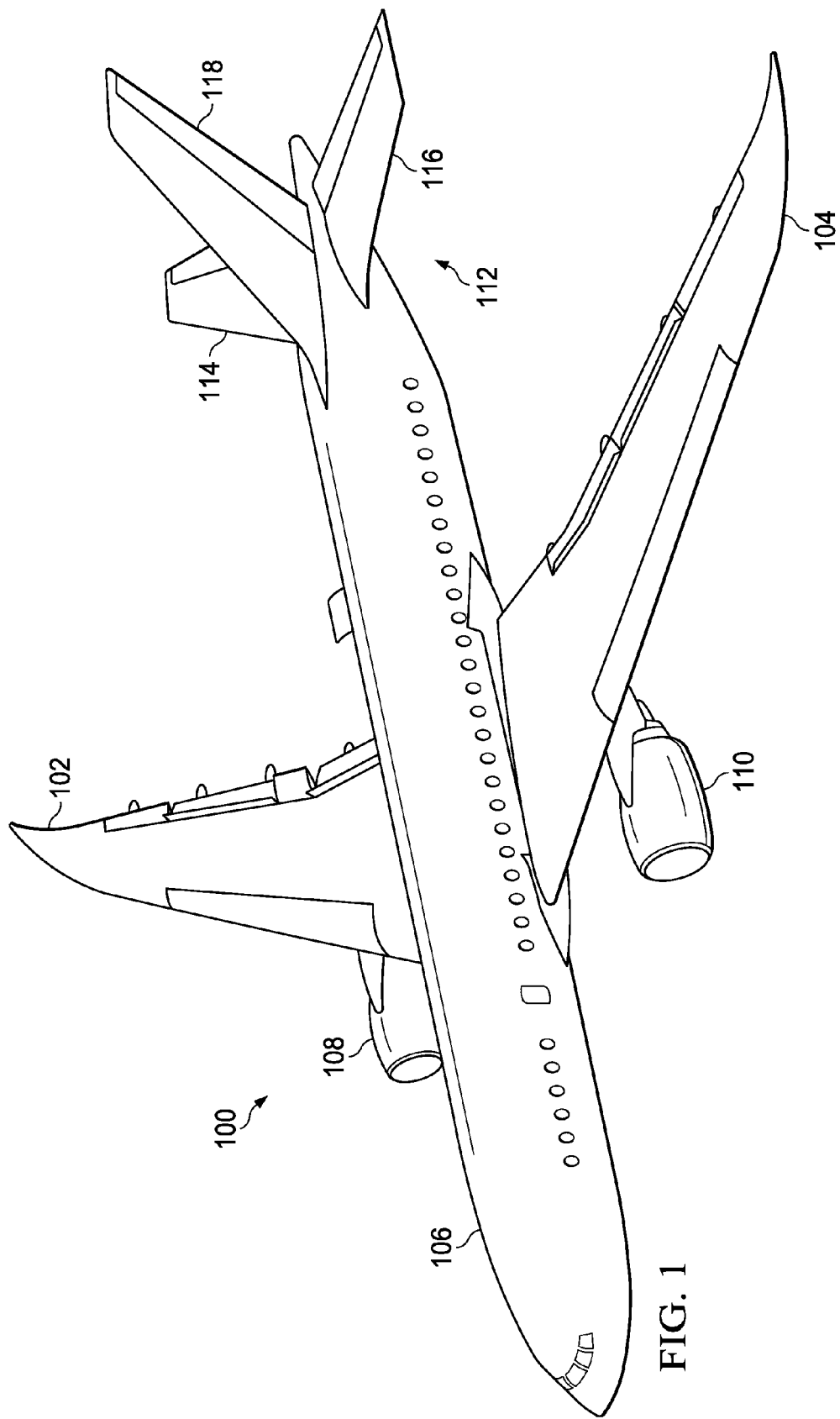
FIG. 1 is an illustration of an aircraft in accordance with an illustrative embodiment.

With reference now to the figures, and in particular, with reference to FIG. 1, an illustration of an aircraft is depicted in accordance with an illustrative embodiment. In this illustrative example, aircraft 100 has wing 102 and wing 104 attached to body 106. Aircraft 100 includes engine 108 attached to wing 102 and engine 110 attached to wing 104.

Body 106 has tail section 112. Horizontal stabilizer 114, horizontal stabilizer 116, and vertical stabilizer 118 are attached to tail section 112 of body 106.

Aircraft 100 is an example of an aircraft in which parts manufactured using three dimensional printing may be implemented in accordance with an illustrative embodiment. In some illustrative examples, portions of the passenger cabin in body 106 may be formed using a three dimensional printed part. For example, a handle of a luggage bin in the passenger cabin of aircraft 100 may use a three dimensional printed part.

The illustration of aircraft 100 in FIG. 1 is not meant to imply physical or architectural limitations to the manner in which an illustrative configuration may be implemented. For example, although aircraft 100 is a commercial aircraft, aircraft 100 may be a military aircraft, a rotorcraft, helicopter, unmanned aerial vehicle, or any other suitable aircraft.

Although the illustrative examples for an illustrative embodiment are described with respect to an aircraft, an illustrative embodiment may be applied to other types of platforms. The platform may be, for example, a mobile platform, a stationary platform, a land-based structure, an aquatic-based structure, and a space-based structure. More specifically, the platform, may be a surface ship, a tank, a personnel carrier, a train, a spacecraft, a space station, a satellite, a submarine, an automobile, a power plant, a bridge, a dam, a house, a windmill, a manufacturing facility, a building, and other suitable platforms.

Figure 2:
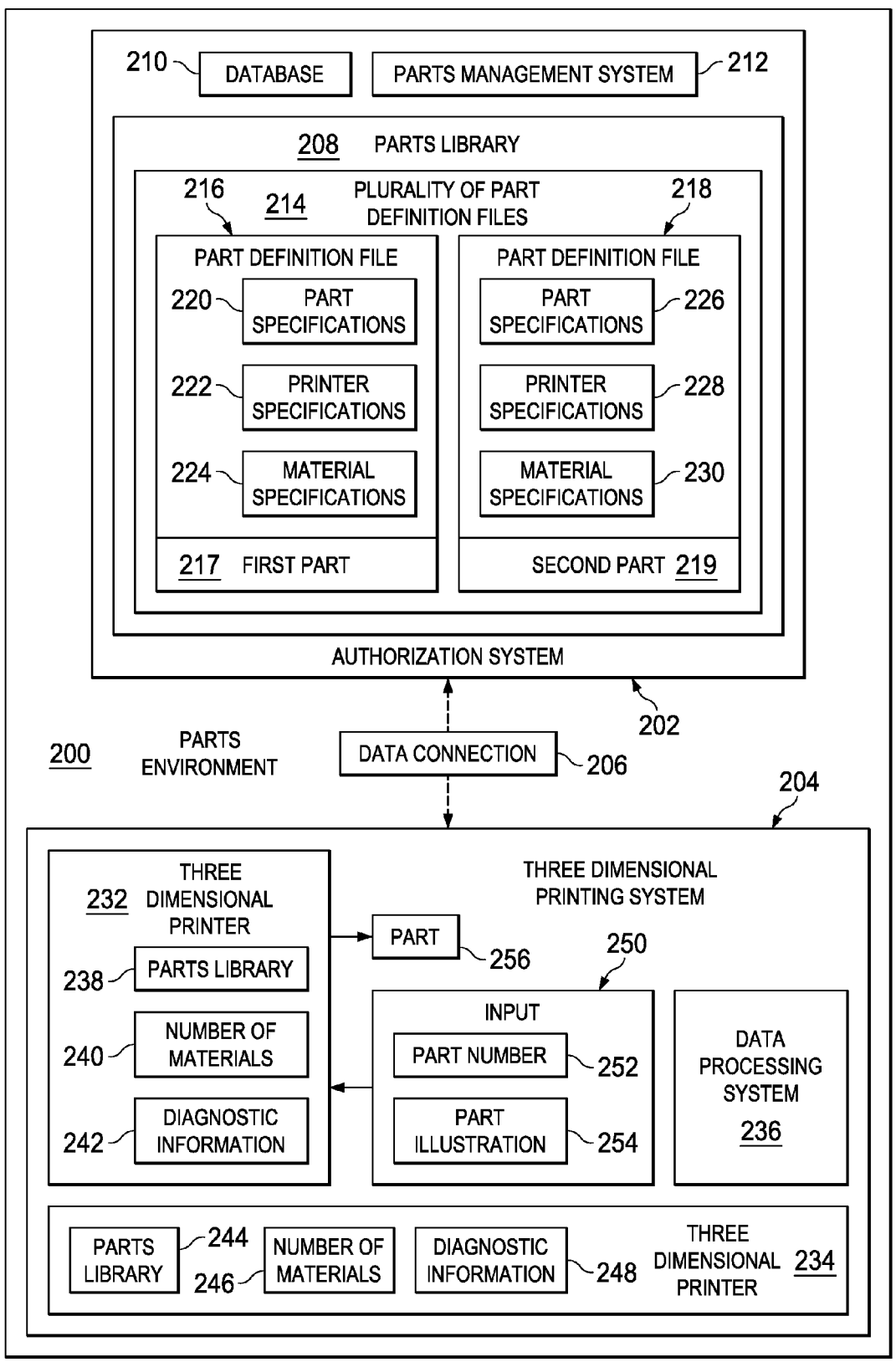
FIG. 2 is an illustration of a block diagram of a parts environment in accordance with an illustrative embodiment.

With reference now to FIG. 2, an illustration of a block diagram of a parts environment is depicted in accordance with an illustrative embodiment. In this illustrative example, parts environment 200 in FIG. 2 is depicted in a block form to illustrate different components for one or more illustrative embodiments. In this illustrative example, parts environment 200 includes authorization system 202 and three dimensional printing system 204 which are in communication via data connection 206. Data connection 206 may be at least one of a wired connection or a wireless connection.

Authorization system 202 is configured to authorize printing of parts by three dimensional printing system 204. Authorization system 202 includes parts library 208, database 210, and parts management system 212.

Parts library 208 stores plurality of part definition files 214. As depicted, plurality of part definition files 214 includes part definition file 216 and part definition file 218. As depicted, two part definition files are depicted in plurality of part definition files 214. However, plurality of part definition files 214 may have any desirable number of part definition files.

Part definition file 216 is a file which may be used by three dimensional printing system 204 to create first part 217. Part definition file 216 includes part specifications 220, printer specifications 222, and material specifications 224. Part specifications 220 include physical specifications for first part 217. Part specifications 220 may include at least one of a three dimensional shape and dimensions.

As used herein, the phrase "at least one of," when used with a list of items, means different combinations of one or more of the listed items may be used and only one of each item in the list may be needed. For example, "at least one of item A, item B, or item C" may include, without limitation, item A or item A and item B. This example also may include item A, item B, and item C or item B and item C. The item may be a particular object, thing, or a category. In other words, at least one of means any combination of items and number of items may be used from the list but not all of the items in the list are required.

Printer specifications 222 include desired properties for a printer to create first part 217 using part definition file 216. In one illustrative example, printer specifications 222 may include a printer resolution. In another illustrative example, printer specifications 222 may include a current printer health. Material specifications 224 include identified materials which may be used to form first part 217 using part definition file 216. Material specifications 224 may be limited by certification of first part 217.

Part definition file 218 is a file which may be used by three dimensional printing system 204 to create second part 219. Part definition file 218 includes part specifications 226, printer specifications 228, and material specifications 230. Part specifications 226 include physical specifications for second part 219. Part specifications 226 may include at least one of a three dimensional shape and dimensions. Printer specifications 228 include desired properties for a printer to create second part 219 using part definition file 218. In one illustrative example, printer specifications 228 may include a printer resolution. In another illustrative example, printer specifications 228 may include a current printer health. Material specifications 230 include identified materials which may be used to form second part 219 using part definition file 218. Material specifications 230 may be limited by certification of second part 219.

Database 210 is configured to store entries identifying the printing of parts using plurality of part definition files 214. In some illustrative examples, database 210 may store an entry for each printing of a part. In some illustrative examples, database 210 may store an entry for each part printed by a customer. In this illustrative example, the entry may contain a field for a number of times the part has been printed by the customer. In some illustrative examples, database 210 may store an entry for each part printed by a three dimensional printer. In this illustrative example, the entry may contain a field for a number of times the part has been printed by the three dimensional printer.

Parts management system 212 is configured to facilitate authorization of three dimensional printing of parts. Parts management system 212 is configured to receive a request for a part definition file, such as part definition file 216, in parts library 208. Parts management system 212 may receive the request from three dimensional printing system 204 via data connection 206. Parts management system 212 is also configured to identify the part definition file, such as part definition file 216, in plurality of part definition files 214 in parts library 208. After identifying part definition file 216, parts management system 212 may encrypt and send part definition file 216 to three dimensional printing system 204. Parts management system 212 may send part definition file 216 via data connection 206 after encryption.

Parts management system 212 is further configured to receive an indication of a printing of a part using the part definition file. In one illustrative example, this indication may be an indication of printing first part 217 using part definition file 216 by three dimensional printing system 204. Parts management system 212 is also configured to store an entry identifying a printing of the part using the part definition file in the database. Additionally, parts management system 212 is configured to request payment in response to an event. In some illustrative examples, the event may be receiving the indication of the printing of the part using the part definition file. In some other illustrative examples, the event may be receiving a message from three dimensional printing system 402 that a desired number of parts has been printed using the part definition file.

As depicted, three dimensional printing system 204 has three dimensional printer 232, three dimensional printer 234, and data processing system 236. As depicted, three dimensional printing system contains two three dimensional printers. However, three dimensional printing system 204 may contain any desirable number of three dimensional printers. Likewise, three dimensional printing system 204 may contain any desirable number of data processing systems.

Three dimensional printer 232 has parts library 238, number of materials 240, and diagnostic information 242. In some illustrative examples, parts library 238 may not initially contain any part definition files. In these illustrative examples, a part definition file may be loaded to parts library 238 prior to printing a part using three dimensional printer 232. In these illustrative examples, the part definition file may be deleted following printing a part using the part definition file.

In some other illustrative examples, parts library 238 may contain a plurality of part definition files. In these illustrative examples, authorization system 202 may update parts library 238 as desired. For example, authorization system 202 may add a number of part definition files to parts library 238. Part definition files may be added to parts library 238 after the client purchases a new type of aircraft. Part definition files may be added to parts library 238 after new part definition files are created by the aircraft manufacturer. As another example, authorization system 202 may update specifications for a number of part definition files of parts library 238 to keep parts library 238 up to date. Specifications for a number of part definition files of parts library 238 may be updated as changes are made to parts by the aircraft manufacturer.

Three dimensional printer 232 may manufacture parts using number of materials 240. Number of materials 240 may be selected from at least one of metals, metal alloys, polymers, or other desirable materials.

Diagnostic information 242 may include printer resolution, printer health information, or any other printer information. In some illustrative examples, parts management system 212 may verify that diagnostic information 242 conforms to at least one of printer specifications 222 or material specifications 224 of part definition file 216. In some illustrative examples, parts management system 212 may verify that diagnostic information 242 conforms to at least one of printer specifications 228 or material specifications 230 of part definition file 218.

As depicted, three dimensional printer 232 receives input 250. Input 250 may be at least one of part number 252 and part illustration 254. In some illustrative examples, three dimensional printer 232 may identify a part definition file for a part using input 250. In some illustrative examples, data processing system 236 may be in communication with three dimensional printer 232 and may identify a part definition file for a part using input 250. After identifying the part definition file, three dimensional printing system 204 sends a request for the part definition file to authorization system 202.

In some illustrative examples, after sending a request, three dimensional printing system 204 receives the part definition file, such as part definition file 216. In some illustrative examples, after sending a request, three dimensional printing system 204 receives authorization to print a part using a part definition file on three dimensional printer 232 or three dimensional printer 234. After receiving a part definition file or authorization to print a part, three dimensional printer 232 may print part 256. Part 256 may be printed using a part definition file from plurality of part definition files 214 or from parts library 238. In some illustrative examples, part 256 may be an implementation of first part 217. In some illustrative examples, part 256 may be an implementation of second part 219.

Three dimensional printer 234 has parts library 244, number of materials 246, and diagnostic information 248. In some illustrative examples, parts library 244 may not initially contain any part definition files. In these illustrative examples, a part definition file may be loaded to parts library 244 prior to printing a part using three dimensional printer 234. In these illustrative examples, the part definition file may be deleted following printing a part using the part definition file.

In some other illustrative examples, parts library 244 may contain a plurality of part definition files. In these illustrative examples, authorization system 202 may update parts library 244 as desired. For example, authorization system 202 may add a number of part definition files to parts library 244. Part definition files may be added to parts library 244 after the client purchases a new type of aircraft. Part definition files may be added to parts library 244 after new part definition files are created by the aircraft manufacturer. As another example, authorization system 202 may update specifications for a number of part definition files of parts library 244 to keep parts library 244 up to date. Specifications for a number of part definition files of parts library 244 may be updated as changes are made to parts by the aircraft manufacturer.

Three dimensional printer 234 may manufacture parts using number of materials 246. Number of materials 246 may be selected from at least one of metals, metal alloys, polymers, or other desirable materials.

Diagnostic information 248 may include printer resolution, printer health information, or any other printer information. In some illustrative examples, parts management system 212 may verify that diagnostic information 248 conforms to at least one of printer specifications 222 or material specifications 224 of part definition file 216. In some illustrative examples, parts management system 212 may verify that diagnostic information 248 conforms to at least one of printer specifications 228 or material specifications 230 of part definition file 218.

By having authorization system 202 authorize the three dimensional printing of parts, the owner of part definition files may control who accesses the part definition files. In some illustrative examples, the owner may be an aircraft manufacturer. Further, by having authorization system 202 authorize the three dimensional printing of parts, the owner of part definition files may track the number of times a specific part is printed. Additionally, by having authorization system 202 authorize the three dimensional printing of parts, the owner of part definition files may request payment for each printing of a part. By verifying diagnostic information of a three dimensional printing system, the authorization system may verify a three dimensional printing of a part may meet certification standards.

The illustration of parts environment 200 in FIG. 2 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, as depicted, two part definition files are depicted in plurality of part definition files 214. However, plurality of part definition files 214 may have any desirable number of part definition files.

Turning now to FIG. 3, an illustration of a database is depicted in accordance with an illustrative embodiment. Database 300 is an implementation of database 210 of FIG. 2.

Database 300 stores entries 302. As depicted, entries 302 have identifiers 304. Identifiers 304 comprise transaction number 306, client number 308, printer number 310, part number 312, part definition file location 314, and print time 316. Transaction number 306 is a unique identifier for the respective printing of the part. Client number 308 is an identifier for the client that printed the part. The client is the owner of the three dimensional printing system which printed the part. Printer number 310 is an identifier for the three dimensional printer that printed the part. Part number 312 is an identifier for the particular part that was printed. Part definition file location 314 identifies whether the part was printed using a part definition file from the authorization system or the three dimensional printing system. Print time 316 is an identifier of the date and time the indication of the printing was received.

As depicted, entries 302 comprise one entry for each printing of a part. In some illustrative examples, entries 302 may comprise one entry for each part. In these illustrative examples, each entry may have an additional identifier for the number of times the part has been printed.

Figure 4:
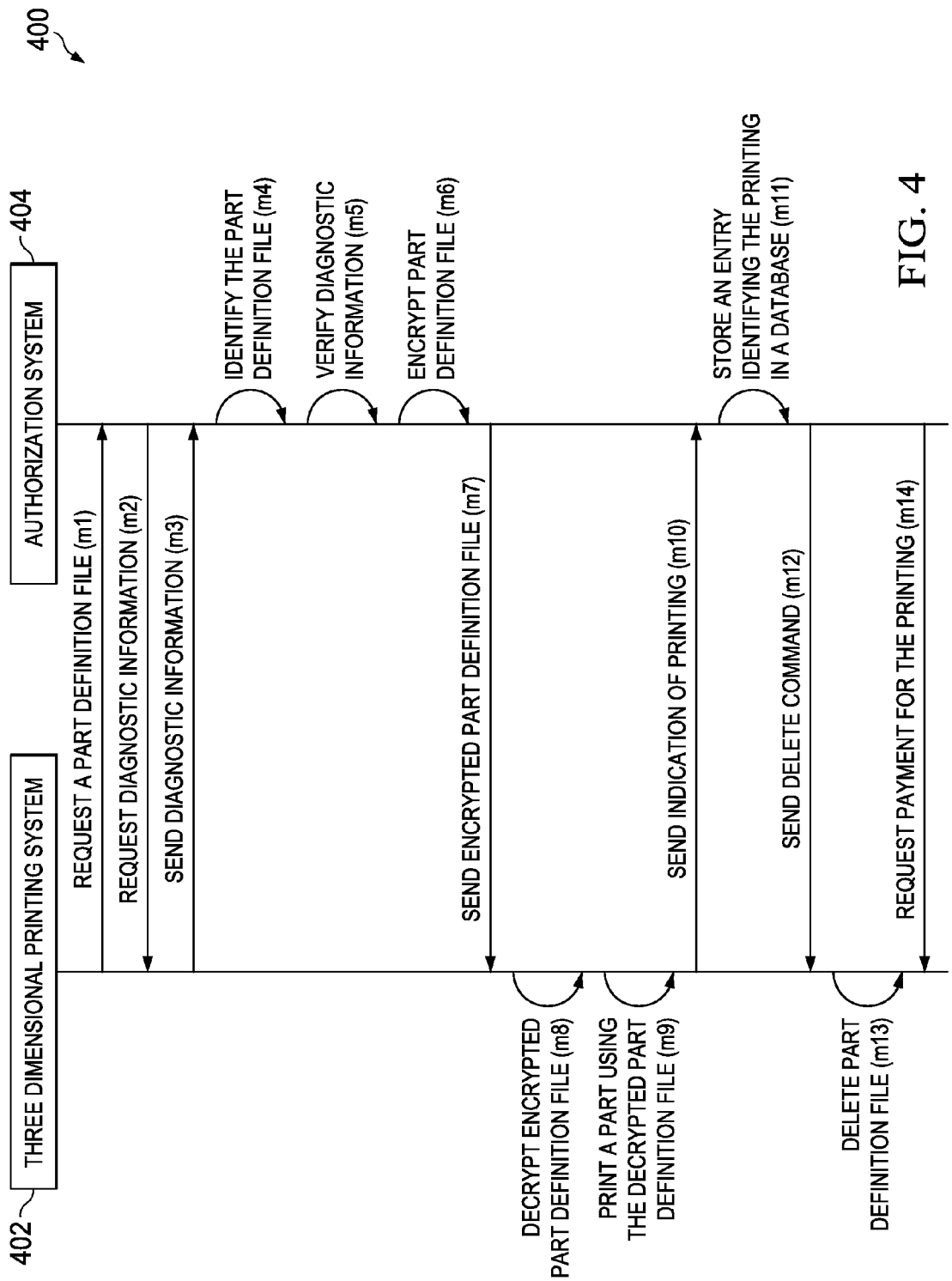
FIG. 4 is an illustration of a data flow in accordance with an illustrative embodiment.

With reference now to FIG. 4, an illustration of a data flow is depicted in accordance with an illustrative embodiment. Data flow 400 is an example of an implementation of communications between authorization system 202 and three dimensional printing system 204 via data connection 206 in FIG. 2. Three dimensional printing system 402 is an example of an implementation of three dimensional printing system 204 of FIG. 2. Authorization system 404 is an example of an implementation of authorization system 202 of FIG. 2.

In data flow 400, each request and information may be a message. In some illustrative examples, a message may be sent within three dimensional printing system 402 or authorization system 404. In some illustrative examples, a message may be sent between three dimensional printing system 402 and authorization system 404. In data flow 400, three dimensional printing system 402 requests a part definition file from authorization system 404. In response to receiving the request for the part definition file, authorization system 404 requests diagnostic information. Three dimensional printing system 402 then sends diagnostic information to authorization system 404.

Authorization system 404 identifies the part definition file. After identifying the part definition file, authorization system 404 verifies that the diagnostic information conforms to at least one of printer specifications and material specifications of the part definition file. After verifying that the diagnostic information is desirable, authorization system 404 encrypts the part definition file. Authorization system 404 then sends the encrypted part definition file to three dimensional printing system 402. Three dimensional printing system 402 decrypts the encrypted part definition file. Three dimensional printing system 402 then prints a part using the decrypted part definition file. After printing the part, three dimensional printing system 402 sends an indication of printing to authorization system 404. In response to the indication of printing, authorization system 404 stores an entry identifying the printing in a database.

Authorization system 404 may then send a delete command to three dimensional printing system 402. In response to the delete command, three dimensional printing system 402 deletes the part definition file. Authorization system 404 requests payment for the printing of the part.

Figure 5:
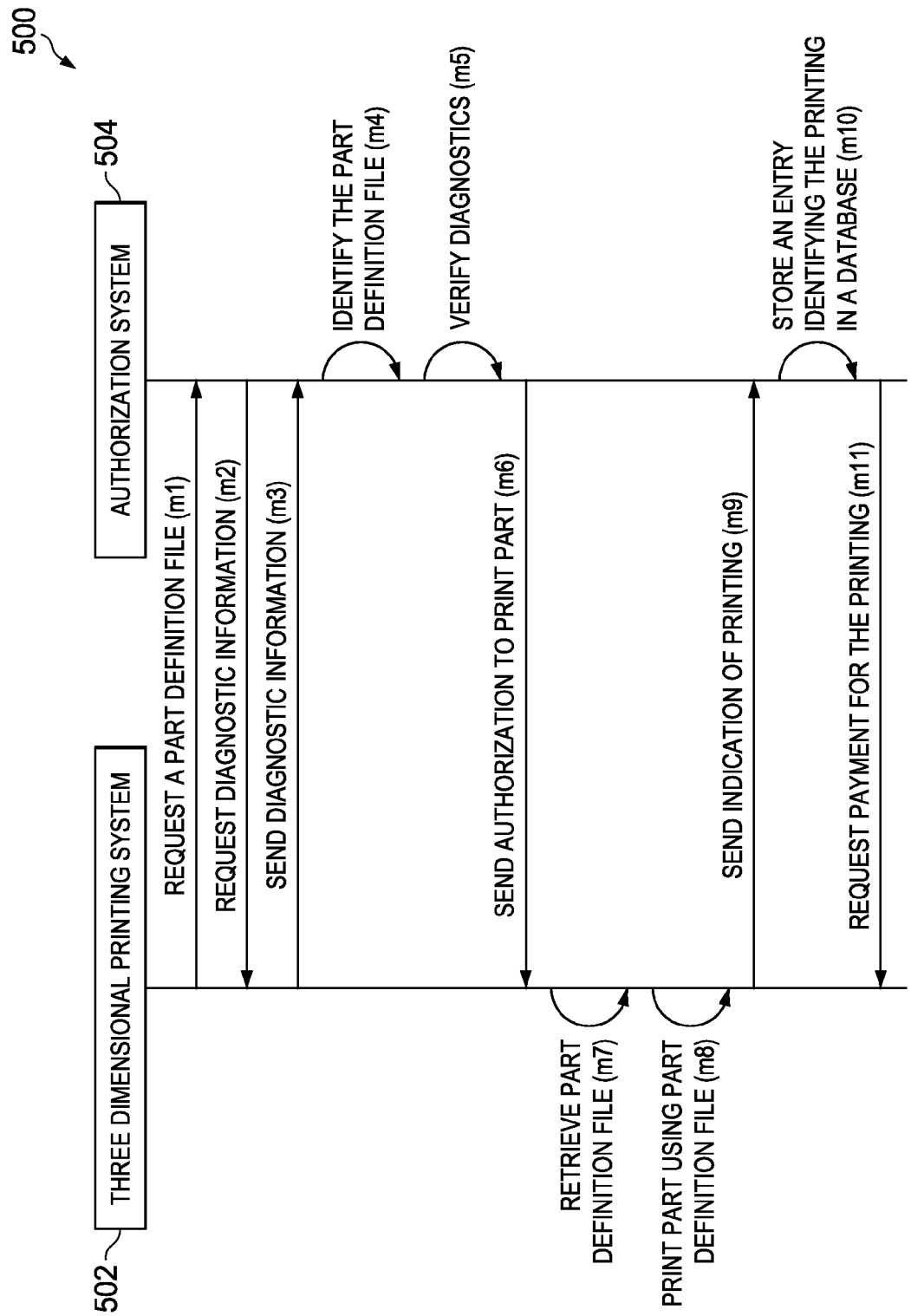
FIG. 5 is another illustration of a data flow in accordance with an illustrative embodiment.

Turning now to FIG. 5, another illustration of a data flow is depicted in accordance with an illustrative embodiment. Data flow 500 is an example of an implementation of communications between authorization system 202 and three dimensional printing system 204 via data connection 206 in FIG. 2. Three dimensional printing system 502 is an example of an implementation of three dimensional printing system 204 of FIG. 2. Authorization system 504 is an example of an implementation of authorization system 202 of FIG. 2.

In data flow 500, each request and information may be a message. In some illustrative examples, a message may be sent within three dimensional printing system 502 or authorization system 504. In some illustrative examples, a message may be sent between three dimensional printing system 502 and authorization system 504. In data flow 500, three dimensional printing system 502 requests a part definition file from authorization system 504 (message m1). In response to receiving the request for the part definition file, authorization system 504 requests diagnostic information (message m2). Three dimensional printing system 502 then sends diagnostic information to authorization system 504 (message m3).

Authorization system 504 identifies the part definition file (message m4). After identifying the part definition file, authorization system 504 verifies that the diagnostic information conforms to at least one of printer specifications and material specifications of the part definition file (message m5). After verifying that the diagnostic information is desirable, authorization system 504 sends authorization to print the part to three dimensional printing system 502 (message m6).

After receiving authorization to print the part, three dimensional printing system 502 retrieves the part definition file (message m7). In some illustrative examples, a three dimensional printer of three dimensional printing system 502 may retrieve the part definition file from a part library on the three dimensional printer. Three dimensional printing system 502 then prints a part using the part definition file (message m8). Afterwards, three dimensional printing system 502 sends an indication of printing to authorization system 504 (message m9).

In response to the indication of printing, authorization system 504 stores an entry identifying the printing in a database (message m10). Authorization system 504 requests payment for the printing of the part from three dimensional printing system 502 (message m11).

Figure 6:
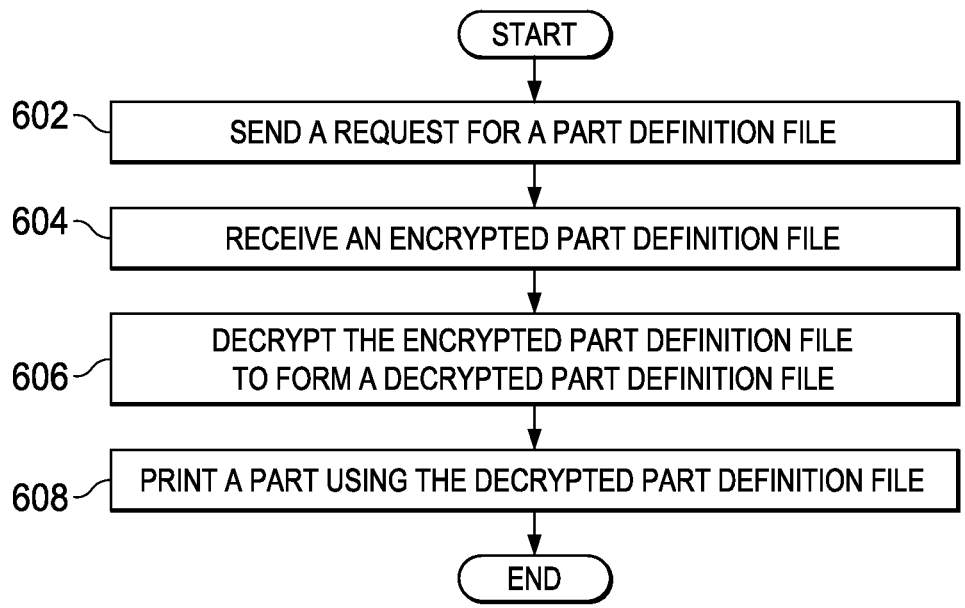
FIG. 6 is an illustration of a flowchart of a process for the three dimensional printing of a part in accordance with an illustrative embodiment.

With reference now to FIG. 6, an illustration of a flowchart of a process for the three dimensional printing of a part is depicted in accordance with an illustrative embodiment. The process illustrated in FIG. 6 may be implemented to print a part using three dimensional printing system 204 of FIG. 2.

The process begins by sending a request for a part definition file (operation 602). In some illustrative examples, the three dimensional printing system may send the request. The three dimensional printing system may be three dimensional printing system 204 of FIG. 2. In some illustrative examples, the part definition file may be selected by a part number to be printed.

The process then receives an encrypted part definition file (operation 604). The process next decrypts the encrypted part definition file to form a decrypted part definition file (operation 606). The process may then print a part using the decrypted part definition file (operation 608). The process terminates thereafter.

Figure 7:
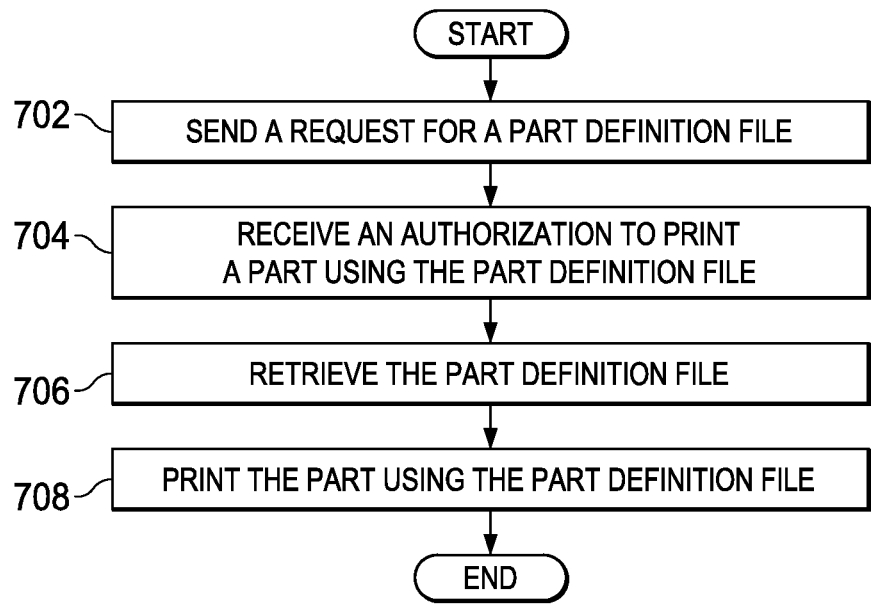
FIG. 7 is another illustration of a flowchart of a process for the three dimensional printing of a part in accordance with an illustrative embodiment.

Turning now to FIG. 7, another illustration of a flowchart of a process for the three dimensional printing of a part is depicted in accordance with an illustrative embodiment. The process illustrated in FIG. 7 may be implemented to print a part using a three dimensional printing system such as three dimensional printing system 204 of FIG. 2.

The process begins by sending a request for a part definition file (operation 702). The process then receives an authorization to print a part using the part definition file (operation 704). Next, the process retrieves the part definition file (operation 706). In some illustrative examples, the part definition file may be retrieved from a data processing system of the three dimensional printing system. This data processing system may be data processing system 236 of three dimensional printing system 204 of FIG. 2. In some illustrative examples, the part definition file may be retrieved from a three dimensional printer, such as three dimensional printer 232 of FIG. 2. The process then prints the part using the part definition file (operation 708). The process terminates thereafter.

Figure 8:
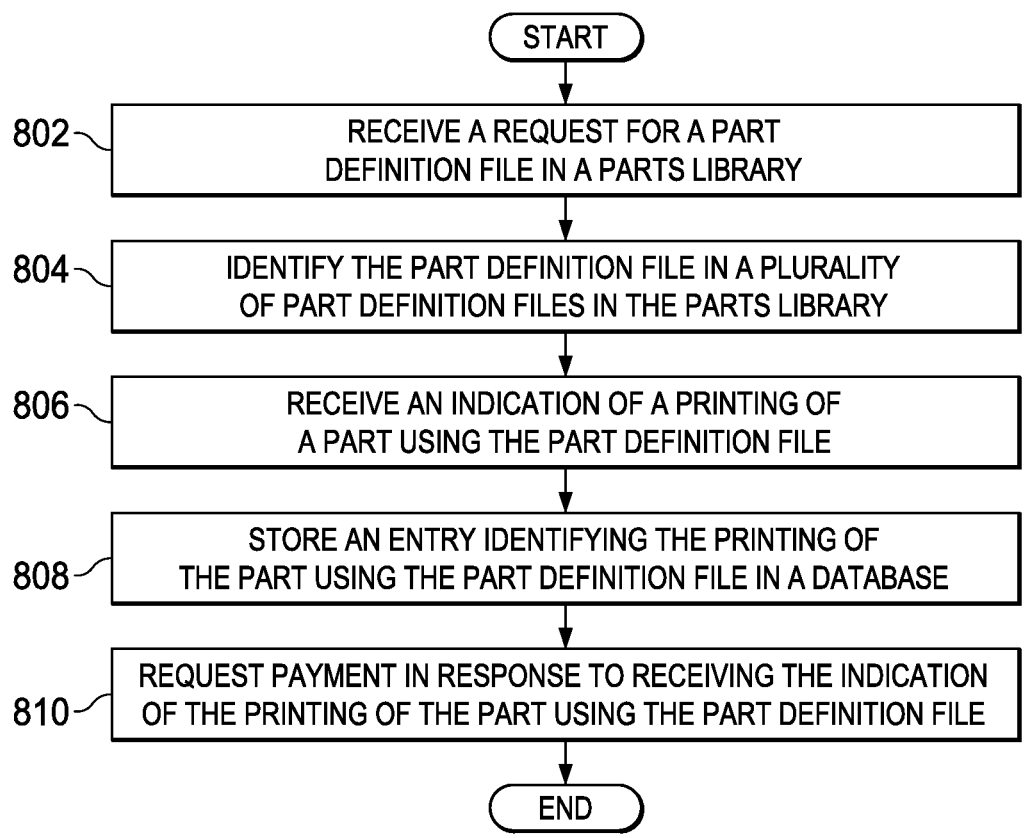
FIG. 8 is an illustration of a flowchart of a process for authorizing the three dimensional printing of a part in accordance with an illustrative embodiment.

With reference now to FIG. 8, an illustration of a flowchart of a process for authorizing the three dimensional printing of a part is depicted in accordance with an illustrative embodiment. The process illustrated in FIG. 8 may be implemented to authorize the three dimensional printing of a part. The process illustrated in FIG. 8 may be implemented using an authorization system such as authorization system 202 of FIG. 2.

The process begins by receiving a request for a part definition file in a parts library (operation 802). The request may be received by an authorization system from a three dimensional printing system. The authorization system may be authorization system 202 of FIG. 2. The three dimensional printing system may be three dimensional printing system 204 of FIG. 2. The process then identifies the part definition file in a plurality of part definition files in the parts library (operation 804). The process next receives an indication of a printing of a part using the part definition file (operation 806). The process then stores an entry identifying the printing of the part using the part definition file in a database (operation 808). The process then requests payment in response to receiving the indication of the printing of the part using the part definition file (operation 810). Afterwards the process terminates.

Figure 9:
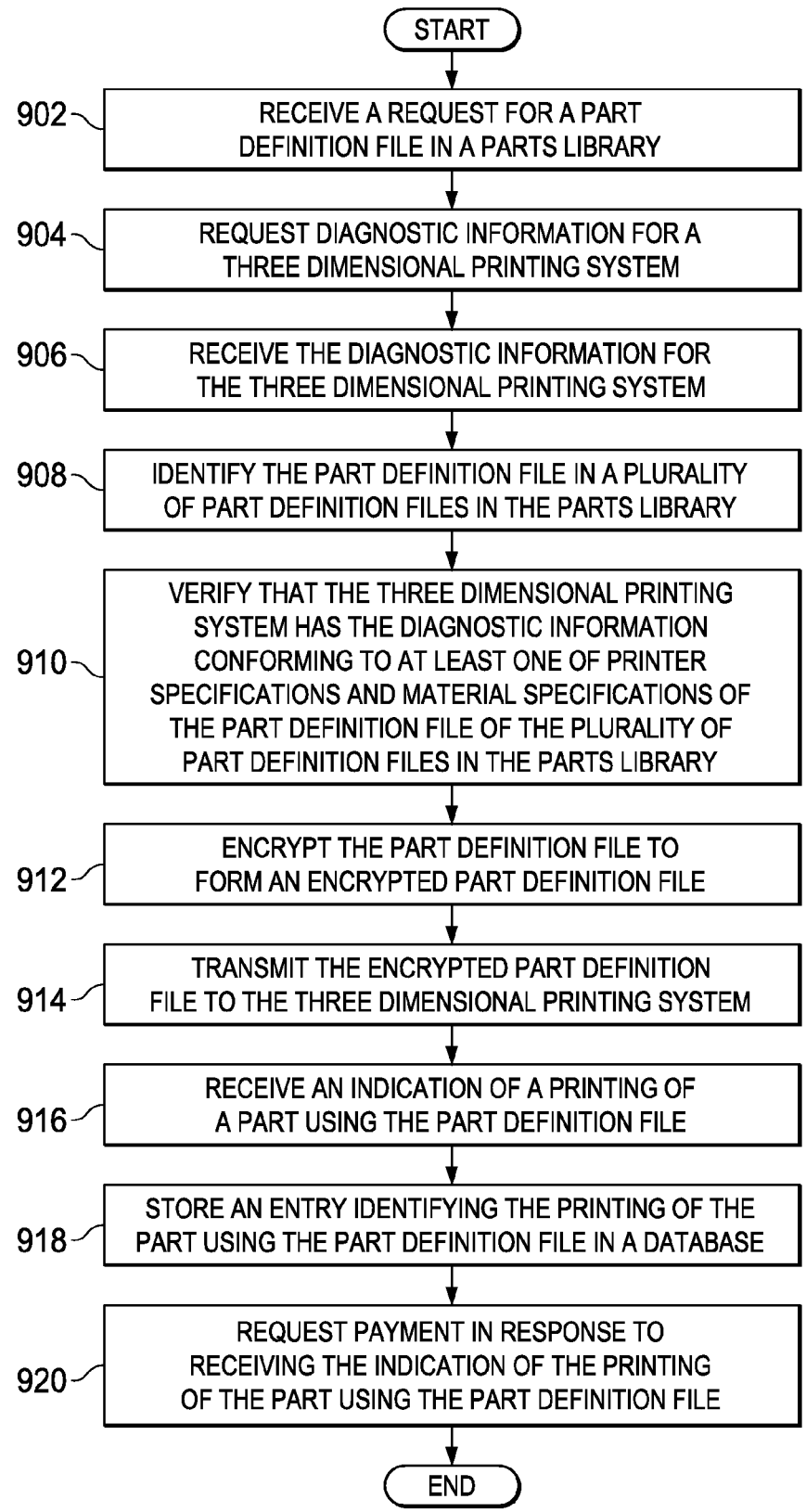
FIG. 9 is another illustration of a flowchart of a process for authorizing the three dimensional printing of a part in accordance with an illustrative embodiment.

Turning now to FIG. 9, another illustration of a flowchart of a process for authorizing three dimensional printing of a part is depicted in accordance with an illustrative embodiment. The process illustrated in FIG. 9 may be implemented to authorize the three dimensional printing of a part. The process illustrated in FIG. 9 may be implemented using an authorization system such as authorization system 202 of FIG. 2.

The process begins by receiving a request for a part definition file in a parts library (operation 902). The process then requests diagnostic information for a three dimensional printing system (operation 904). The process then receives the diagnostic information for the three dimensional printing system (operation 906). The process then identifies the part definition file in a plurality of part definition files in the parts library (operation 908). The process then verifies that the three dimensional printing system has the diagnostic information conforming to at least one of printer specifications and material specifications of the part definition file of the plurality of part definition files in the parts library (operation 910). The process next encrypts the part definition file to form an encrypted part definition file (operation 912). The process then transmits the encrypted part definition file to the three dimensional printing system (operation 914). The process next receives an indication of a printing of a part using the part definition file (operation 916). The process then stores an entry identifying the printing of the part using the part definition file in the database (operation 918). The process then requests payment in response to receiving the indication of the printing of the part using the part definition file (operation 920). The process terminates thereafter.

Figure 10:
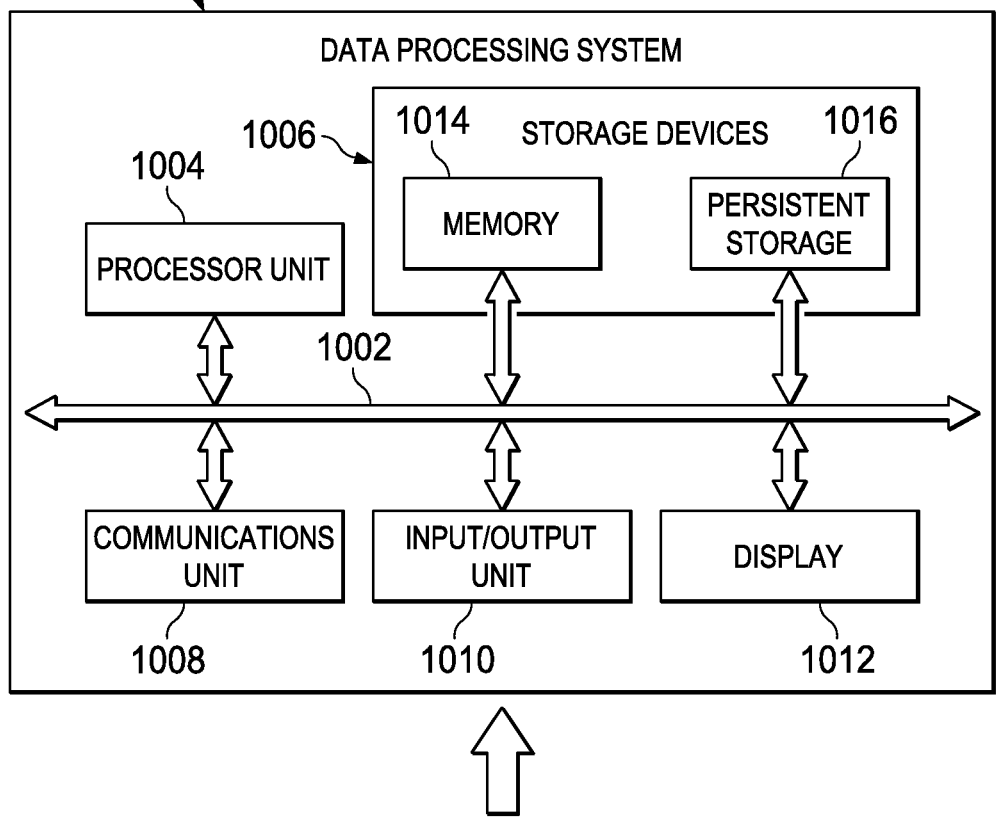
FIG. 10 is an illustration of a block diagram of a data processing system in accordance with an illustrative embodiment.

With reference now to FIG. 10, an illustration of a block diagram of a data processing system is depicted in accordance with an illustrative embodiment. Data processing system 1000 may be used to implement one or more computers in authorization system 202 in FIG. 2. Further, data processing system 1000 may be an implementation of data processing system 236 of FIG. 2. As depicted, data processing system 1000 includes communications framework 1002, which provides communications between processor unit 1004, storage devices 1006, communications unit 1008, input/output unit 1010, and display 1012. In some cases, communications framework 1002 may be implemented as a bus system.

Processor unit 1004 is configured to execute instructions for software to perform a number of operations. Processor unit 1004 may comprise a number of processors, a multi-processor core, and/or some other type of processor, depending on the implementation. In some cases, processor unit 1004 may take the form of a hardware unit, such as a circuit system, an application specific integrated circuit (ASIC), a programmable logic device, or some other suitable type of hardware unit.

Instructions for the operating system, applications, and/or programs run by processor unit 1004 may be located in storage devices 1006. Storage devices 1006 may be in communication with processor unit 1004 through communications framework 1002. As used herein, a storage device, also referred to as a computer readable storage device, is any piece of hardware capable of storing information on a temporary and/or permanent basis. This information may include, but is not limited to, data, program code, and/or other information.

Memory 1014 and persistent storage 1016 are examples of storage devices 1006. Memory 1014 may take the form of, for example, a random access memory or some type of volatile or non-volatile storage device. Persistent storage 1016 may comprise any number of components or devices. For example, persistent storage 1016 may comprise a hard drive, a flash memory, a rewritable optical disk, a rewritable magnetic tape, or some combination of the above. The media used by persistent storage 1016 may or may not be removable.

Communications unit 1008 allows data processing system 1000 to communicate with other data processing systems and/or devices. Communications unit 1008 may provide communications using physical and/or wireless communications links.

Input/output unit 1010 allows input to be received from and output to be sent to other devices connected to data processing system 1000. For example, input/output unit 1010 may allow user input to be received through a keyboard, a mouse, and/or some other type of input device. As another example, input/output unit 1010 may allow output to be sent to a printer connected to data processing system 1000.

Display 1012 is configured to display information to a user. Display 1012 may comprise, for example, without limitation, a monitor, a touch screen, a laser display, a holographic display, a virtual display device, and/or some other type of display device.

In this illustrative example, the processes of the different illustrative embodiments may be performed by processor unit 1004 using computer-implemented instructions. These instructions may be referred to as program code, computer usable program code, or computer readable program code and may be read and executed by one or more processors in processor unit 1004.

In these examples, program code 1018 is located in a functional form on computer readable media 1020, which is selectively removable, and may be loaded onto or transferred to data processing system 1000 for execution by processor unit 1004. Program code 1018 and computer readable media 1020 together form computer program product 1022. In this illustrative example, computer readable media 1020 may be computer readable storage media 1024 or computer readable signal media 1026.

Computer readable storage media 1024 is a physical or tangible storage device used to store program code 1018 rather than a medium that propagates or transmits program code 1018. Computer readable storage media 1024 may be, for example, without limitation, an optical or magnetic disk or a persistent storage device that is connected to data processing system 1000.

Alternatively, program code 1018 may be transferred to data processing system 1000 using computer readable signal media 1026. Computer readable signal media 1026 may be, for example, a propagated data signal containing program code 1018. This data signal may be an electromagnetic signal, an optical signal, and/or some other type of signal that can be transmitted over physical and/or wireless communications links.

The illustration of data processing system 1000 in FIG. 10 is not meant to provide architectural limitations to the manner in which the illustrative embodiments may be implemented. The different illustrative embodiments may be implemented in a data processing system that includes components in addition to or in place of those illustrated for data processing system 1000. Further, components shown in FIG. 10 may be varied from the illustrative examples shown.

Figure 11:
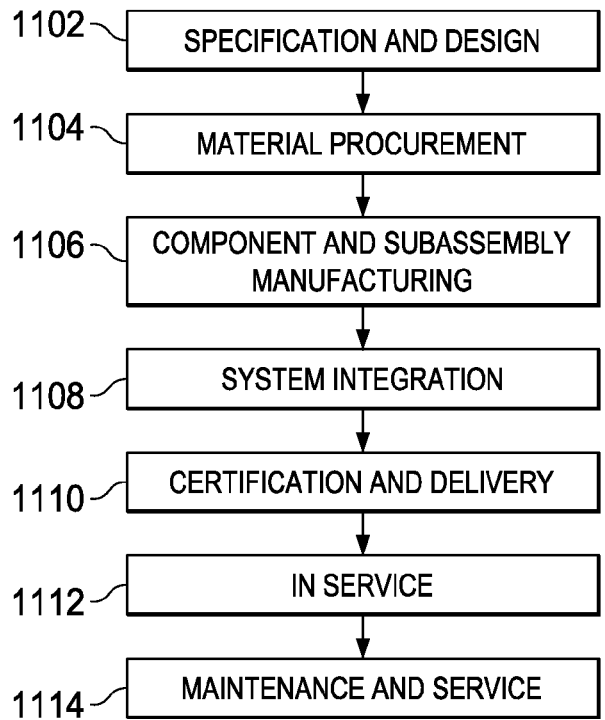
FIG. 11 is an illustration of a block diagram of an aircraft manufacturing and service method in accordance with an illustrative embodiment.
Figure 12:
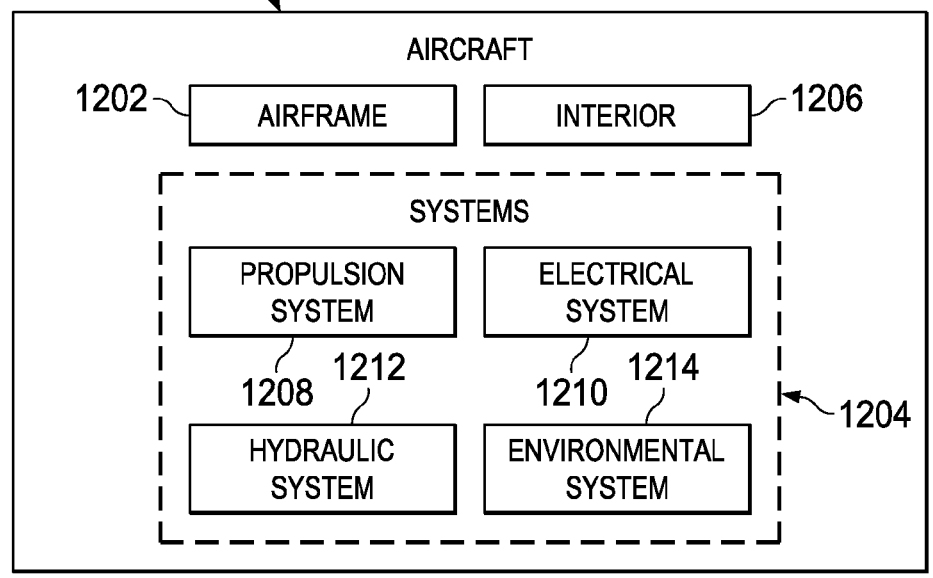
FIG. 12 is an illustration of a block diagram of an aircraft in which an illustrative embodiment may be implemented.

Illustrative embodiments of the disclosure may be described in the context of aircraft manufacturing and service method 1100 as shown in FIG. 11 and aircraft 1200 as shown in FIG. 12. Turning first to FIG. 11, an illustration of a block diagram of an aircraft manufacturing and service method is depicted in accordance with an illustrative embodiment. During pre-production, aircraft manufacturing and service method 1100 may include specification and design 1102 of aircraft 1200 in FIG. 12 and material procurement 1104.

During production, component and subassembly manufacturing 1106 and system integration 1108 of aircraft 1200 in FIG. 12 takes place. Thereafter, aircraft 1200 in FIG. 12 may go through certification and delivery 1110 in order to be placed in service 1112. While in service 1112 by a customer, aircraft 1200 in FIG. 12 is scheduled for routine maintenance and service 1114, which may include modification, reconfiguration, refurbishment, and other maintenance or service.

Each of the processes of aircraft manufacturing and service method 1100 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 12, an illustration of a block diagram of an aircraft is depicted in which an illustrative embodiment may be implemented. In this example, aircraft 1200 is produced by aircraft manufacturing and service method 1100 in FIG. 11 and may include airframe 1202 with plurality of systems 1204 and interior 1206. Examples of systems 1204 include one or more of propulsion system 1208, electrical system 1210, hydraulic system 1212, and environmental system 1214. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 1100 in FIG. 11. One or more illustrative embodiments may be used during maintenance and service 1114. For example, three dimensional printing system 204 may also be used to print parts to perform replacements during maintenance and service 1114. Parts for aircraft 1200 may be three dimensionally printed during scheduled maintenance for aircraft 1200.

Thus, the illustrative embodiments provide a method and apparatus for authorizing the three dimensional printing of parts. By having authorization system 202 authorize the three dimensional printing of parts, the owner of part definition files may control who accesses the part definition files. In some illustrative examples, the owner may be an aircraft manufacturer. Further, by having authorization system 202 authorize the three dimensional printing of parts, the owner of part definition files may track the number of times a specific part is printed. Additionally, by having authorization system 202 authorize the three dimensional printing of parts, the owner of part definition files may request payment for each printing of a part. By verifying diagnostic information of a three dimensional printing system, the authorization system may verify that a three dimensional printing of a part may meet certification standards.

By providing a mechanism for authorizing the three dimensional printing of parts, a client may three dimensionally print replacement parts instead of ordering replacement parts from a manufacturer. By three dimensionally printing parts, a client may reduce the time prior to installation of a replacement part. By three dimensionally printing parts, a client may reduce the resources allocated to storage of replacement parts.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent a module, a segment, a function, and/or a portion of an operation or step.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An apparatus comprising:
   a parts library configured to store a plurality of part definition files, wherein the part definition files define three dimensional aircraft parts;
   a database configured to store entries identifying a printing of parts using the plurality of part definition files; and
   a parts management system configured:
   to receive a request for a part definition file in the parts library from a three dimensional printing system,
   to identify the part definition file in the plurality of part definition files in the parts library, to verify that the three dimensional printing system meets part certification standards for airworthiness of a three dimensional aircraft part to be printed using the identified part definition file based on diagnostic information that includes information regarding printer resolution and printer health for the three dimensional printing system conforming to printer specifications and material specifications for the part as defined by the part definition file of the plurality of part definition files in the parts library, to send authorization to print the part on the three dimensional printing system using the part definition file in response to verifying conformation of the diagnostic information that the three dimensional printing system meets part certification standards for the part to be printed based, to receive an indication of a printing of the part using the part definition file, to store an entry identifying the printing of the part using the part definition file in the database, and
   to send a delete command to delete the part definition file to the three dimensional printing system in response to receiving the indication of the printing of the part.

2. The apparatus of claim 1, wherein the parts management system is further configured to:
   request payment in response to receiving the indication of the printing of the part using the part definition file.

3. The apparatus of claim 1, wherein the parts management system is further configured to:
   transmit the part definition file to the three dimensional printing system.

4. The apparatus of claim 3, wherein the parts management system is further configured to encrypt the part definition file to form an encrypted part definition file, and transmit the encrypted part definition file to the three dimensional printing system.

5. The apparatus of claim 1, wherein the parts library is a first parts library, and wherein the parts management system is further configured to update a second parts library in a three dimensional printing system using the plurality of part definition files in the first parts library.

6. A method comprising:
   receiving a request for a part definition file in a parts library, from a three dimensional printing system, wherein the part definition file defines a three dimensional aircraft part;
   identifying the part definition file in a plurality of part definition files in the parts library;
   verifying that the three dimensional printing system meets parts certification standards for airworthiness of a three dimensional aircraft part to be printed using the identified part definition file based on diagnostic information that includes information regarding printer resolution and printer health for the three dimensional printing system conforming to printer specifications and material specifications for the part as defined by the part definition file of the plurality of part definition files in the parts library;
   receiving an indication of a printing of the part using the part definition file; storing an entry identifying the printing of the part using the part definition file in a database; and
   deleting the part definition file from the three dimensional printing system.

7. The method of claim 6, further comprising:
   requesting payment in response to receiving the indication of the printing of the part using the part definition file.

8. The method of claim 6, further comprising:
   sending the part definition file in the plurality of part definition files to the three dimensional printing system.

9. The method of claim 6, further comprising:
   encrypting the part definition file before sending the part definition file in the plurality of part definition files to a three dimensional printing system.

10. A system comprising:
   a parts library configured to store a plurality of part definition files, wherein the part definition files define three dimensional aircraft parts;
   a database configured to store entries identifying a printing of parts using the plurality of part definition files;
   a parts management system configured;
   to receive a request for a part definition file in the parts library from a three dimensional printing system;
   to verify that the three dimensional printing system meets part certification standards for airworthiness of a three dimensional aircraft part to be printed using the part definition file based on diagnostic information that includes information regarding printer resolution and printer health for the three dimensional printing system conforming to printer specifications and material specifications for the part as defined by the part definition file of the plurality of part definition files in the parts library, and to send authorization to print the part on the three dimensional printing system using the part definition file in response to verifying conformation of the diagnostic information that the three dimensional printing system meets part certification standards for the part to be printed;

the three dimensional printing system configured to print the aircraft part; and delete the part definition file in response printing the aircraft part.

11. The system of claim 10, wherein the parts library is located in the three dimensional printing system.

12. The system of claim 10, wherein the database and the parts management system are located in an authorization system, and wherein the authorization system is configured to update the parts library by adding a number of part definition files to the parts library.

13. The system of claim 10, wherein the database and the parts management system are located in an authorization system, and wherein the authorization system is configured to update specifications for a number of part definition files of the parts library to keep the parts library up to date.

14. The system of claim 10, wherein the database and the parts management system are located in an authorization system.

15. The system of claim 14, wherein the authorization system and the three dimensional printing system are connected by a data connection.

16. The system of claim 10, wherein the three dimensional printing system comprises a number of three dimensional printers.

17. The system of claim 16, wherein the three dimensional printing system further comprises a data processing system.

* * * * *